United States Patent [19]

Ogawa et al.

[11] Patent Number: 4,902,585
[45] Date of Patent: Feb. 20, 1990

[54] RECORDING MEDIUM AND METHOD OF PRODUCING THE SAME

[75] Inventors: Kazufumi Ogawa, Hirakata; Hideharu Tamura, Katano, both of Japan

[73] Assignee: Matsushita Electric Industrial Co., Ltd., Osaka, Japan

[21] Appl. No.: 159,291

[22] Filed: Feb. 23, 1988

[30] Foreign Application Priority Data

Mar. 9, 1987 [JP] Japan ................................. 62-53301

[51] Int. Cl.$^4$ ............................................... G11B 5/64
[52] U.S. Cl. .................................. 428/694; 427/131; 428/695; 428/900
[58] Field of Search ...................... 428/694, 695, 900; 427/131

[56] References Cited

U.S. PATENT DOCUMENTS

| | | | |
|---|---|---|---|
| 4,120,995 | 10/1978 | Phipps | 428/900 |
| 4,368,239 | 1/1983 | Nakajima | 428/900 |
| 4,526,836 | 7/1985 | Mukai | 428/900 |
| 4,529,659 | 7/1985 | Hoshino | 428/900 |
| 4,583,145 | 4/1986 | Mönnich | 428/900 |
| 4,696,845 | 9/1987 | Yanagisawa | 428/900 |

Primary Examiner—Paul J. Thibodeau
Attorney, Agent, or Firm—Wenderoth, Lind & Ponack

[57] ABSTRACT

Disclosed is a recording medium which comprises a base body of the recording medium, a recording layer formed on the base body, and a protective layer formed on the recording layer for protecting the recording layer. The protection layer is made from a silane surface active agent containing fluorine atoms (e.g., $CF_3-(CF_2)_m-(CH_2)_n-SiCl_3$ (m, n: integer) and the agent is polymerized with the recording layer. The recording medium may provide high density recording performance.

12 Claims, 3 Drawing Sheets

RECORDING MEDIUM AND METHOD OF PRODUCING THE SAME

BACKGROUND OF THE INVENTION

This invention relates to a recording medium and method of producing the same, and more particularly to formation of a protective layer on a recording layer of a recording medium such as magnetic tape, magnetic disc, magnetic card, opto-magnetic disc, optical disc, etc.

The conventional technology is explained by use of a magnetic recording medium as one example. Magnetic recording media are roughly classified into two types, i.e., coating type and deposition type.

The coating type magnetic recording medium is generally formed by the following method. A magnetic powder such as $Fe_2O_3$ or $\gamma\text{-}Fe_2O_3$ having an additive of CO is mixed with polyvinyl butyral, toluene and methyl isobutyl ketone so that the mixed material becomes coating agent. Then, the coating agent is applied on a surface of a base of the recording medium at $4\sim5$ $\mu$m thickness. This method has an advantage in that production of the recording medium is easy, but has disadvantages in that performance is not sufficient for use in high density recording since there is a limit to reducing the size of magnetic powder.

In contrast, the deposition type has a better recording density than that of the coating type, but has problem in durability since magnetic metal layer is exposed on the surface of the recording medium. To solve this problem, an overcoating is applied on a deposition metal layer of $1000\sim2000$ Å which is formed by use of spattering method or of electron beam, and further, a smoothing agent is applied on the deposition metal layer. However, even this processing can not solve the problem perfectly. That is, sufficient durability can not be obtained. In addition, since overcoating and coating of the smoothing agent of a thinner and even thickness are difficult to carry out, a gap between a recording or reading magnetic head and a recording layer is widened so that it is not difficult to obtain sufficient high density recording performance.

SUMMARY OF THE INVENTION

Accordingly, a principal object of the invention is to provide a recording medium which is capable of providing high density recording performance, and to provide a method of producing such a recording medium.

These and other objects will be accomplished by a recording medium which comprises a base body of the recording medium, at least one recording layer formed on the base body, and at least one protective layer formed on the recording layer directly or indirectly through other material for protecting the recording layer. The protective layer is made from a monomolecular film or mono-molecular cumulative film containing carbon and fluorine as major components and atoms for bonding. In a specific embodiment, a chemical substance of $CF_3\text{---}(CF_2)m\text{---}(CH_2)n\text{---}SiCl_3$ (m, n: integer) is used to form a mono-molecular film or mono-molecular cumulative film. The recording and protection layers may be formed on both surfaces of the base body.

This invention has various advantages, among which are as follows:

(1) It may make possible to provide a recording medium which is capable of high density recording.

(2) It may be possible to provide a recording medium which has a very thin organic film of high density formed on a surface thereof without pin-holes with a uniform thickness. Therefore, in case that the recording medium is a magnetic recording medium as one example, the performance of a recording and reproducing magnetic head is improved and noise is reduced.

(3) It may be possible to provide a method of producing a recording medium in which a protective layer can be readily coated on a surface of a base of a recording medium by pin-hole free and uniform thickness. If it is processed by use of a surface active agent containing fluorine, smoothing can be applied on the surface of the organic film so that smoothing characteristic of the head, i.e., durability is improved.

While the novel features of the invention are set forth with particularity in the appended claims, the invention, both as to organization and content, will be better understood and appreciated, along with other objects and features thereof, from the following detailed description in conjunction with the drawings.

DETAILED DESCRIPTION OF THE INVENTION

Figure 1:
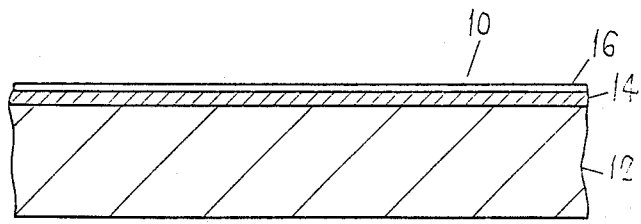
FIG. 1 is a section view of a magnetic recording medium as a first embodiment of the invention.
Figure 2:
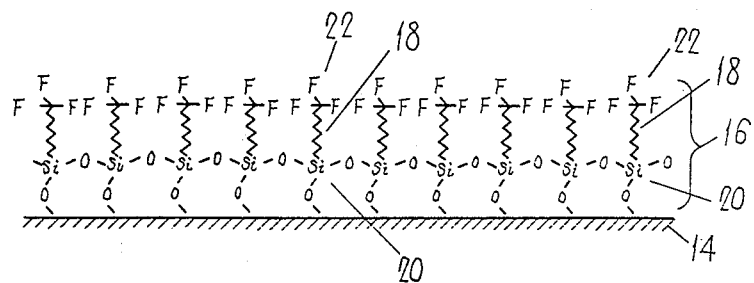
FIG. 2 shows processes for producing the recording medium of the first embodiment.

FIGS. 1 and 2 show a magnetic recording medium as a first embodiment of the invention. The magnetic recording medium 10, as shown in FIG. 1, is constructed as follows. That is, there is provided a disc plate 12 for magnetic recording use (base of recording medium). Magnetic recording layer 14 (e.g., magnetic metal or magnetic metal oxide such as Fe—Ni, Ni—$C_2$, $Fe_2O_3$) is formed on the disc plate 12 by use of spattering deposition method, etc. Thereafter, a silane surface active agent containing fluorine atoms is adsorbed on the magnetic recording layer 14 so that a mono-molecular polymeric protective film 16, which is formed by a silane surface active agent containing fluorine atoms, is formed.

For example, as the silane surface active agent 18, $CF_3\text{---}(CF_2)m\text{---}(CH_2)n\text{---}SiCl_3$ (m, n: integer, the value of approximately $5\sim15$ is the easiest to handle) is used as shown in FIG. 2. There is provided a solution of 80% n-hexane, 12% trichloro carbon and 8% chloroform which are dissolved by concentration of approximately $2\times10^{-3}\sim5.0\times10^{-2}$ Mol/l. Then the base of recording medium 12 on which the magnetic recording layer 14 is formed is immersed in the above-stated solution.

As a result, bonding 20 of

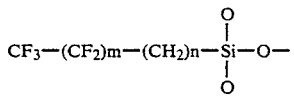

is formed between magnetic recording layer 14 and the silane surface active agent 18 since a natural oxide is formed on the metal surface of the magnetic recording layer 14, so that protective film 16 with high smoothing characteristics of a mono-molecular film, which is formed by a silane surface active agent containing fluorine atoms, is further formed up to the thickness of 20~30 Å in a manner that fluorine atoms 22 are juktaposed as shown in FIG. 2.

Incidentally, the above-stated protective film 16 is applicable to an optical recording medium (e.g., optical disc), semiconductor devices, etc. as their protection film. Further, in case that, as material for chemical adsorption, derivatives of di-acetylene such as $CF_3$—$(CF_2)m$—$(CH_2)n$—C≡C—C≡C—$(CH_2)l$—$SiCl_3$ (n, m, l: integer) are used, a bridge can be formed upon irradiation of ultraviolet rays so that conductivity in the surface direction can be attained and a surface of the base can be prevented from being electrically charged.

Figure 3:
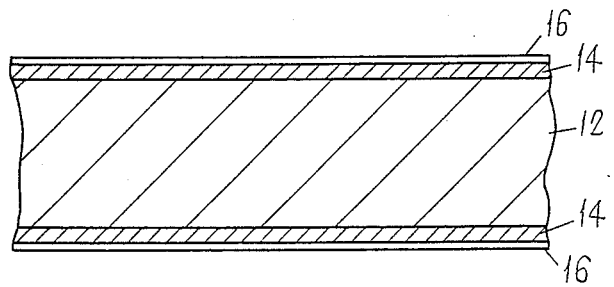
FIG. 3 is a section view of a recording medium as a second embodiment.

Another embodiment of the invention is shown in FIG. 3. The first embodiment is of the recording medium wherein the recording layer is formed on only one surface of the medium, whereas the fourth embodiment is of the recording medium wherein the recording layer 14 and protection film 16 are formed on both surfaces of the base 12.

Figure 4:
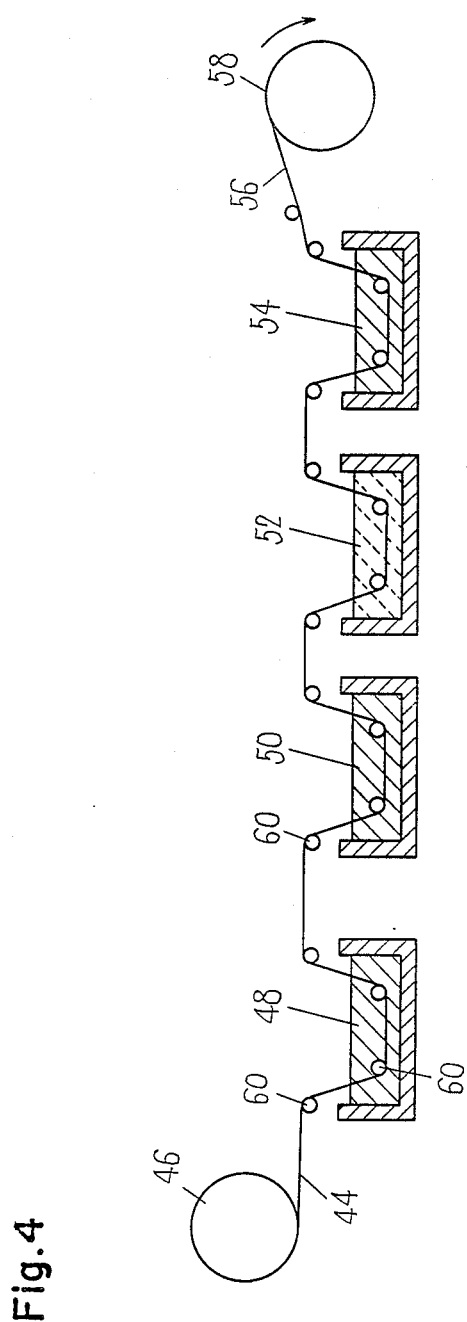
FIG. 4 shows a machine for producing the recording medium.

Another embodiment is shown in FIG. 4. In the case that the recording medium is a magnetic recording tape, a tape manufacturing machine shown in FIG. 4 may be used. An uncoated magnetic recording tape 44 which is supplied from supply drum 46 passes through first solution 48 for chemical absorption, first reaction solution 50, second reaction solution 52 and second solution 54 for chemical adsorption, respectively so that tape 56 having the recording layer and protection film is obtained and taken up by take-up drum 58. In FIG. 4, 60 denotes a capstan for forming a tape feed path.

Figure 5:
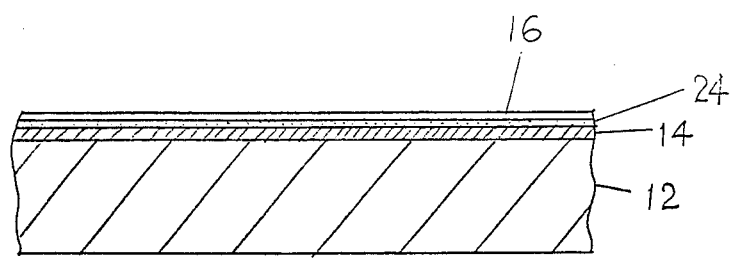
FIG. 5 is a section view of a magnetic recording medium as a third embodiment.

In the above-stated embodiment, mono-molecular film containing fluorine is formed directly on a recording layer by chemical adsorption. However, it is possible to use another structure as shown in FIG. 5. That is, in FIG. 5, an intermediate layer 24, which is made by, for example, $SiO_2$, $Si_3N_4$, C or other metal oxide (e.g., $MoO_3$, $WO_3$) is first formed on recording layer 14 and, protection film 16 is formed on said intermediate layer 24 by chemical adsorption. In this case, durability is further improved.

While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

What is claimed is:

1. A recording medium comprising:
a base body for said recording medium;
at least one recording layer formed on said base body; and
at least one protective layer formed on said recording layer for protecting said recording layer, said protective layer being made from a silane surface active agent containing fluorine atoms by chemical adsorption in non-aqueous solvent containing said silane surface active agent and wherein $CF_3$—$(CF_2)m$—$(CH_2)n$—$SiCl_3$ (m, n: integer) is used as said silane surface active agent.

2. A recording medium comprising:
a base body for said recording medium;
at least one recording layer formed on said base body; and
at least one protective layer formed on said recording layer for protecting said recording layer, said protective layer being a monomolecular polymer film or monomolecular cumulative polymer film made from repeating

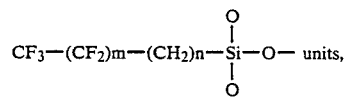

wherein m and n are integers of about 5 to 15 and wherein the said recording layer is bonded to the silicon atoms of said units through an oxygen atom thereof and said silicon atoms of said units are connected to each other through the oxygen atoms thereof.

3. A recording medium comprising: a base body of said recording medium; at least one recording layer containing oxygen atoms thereon formed on said body; and at least one protection layer formed on said recording layer as a lubricant for protecting said recording layer, said protection layer being made from a monomolecular film or mono-molecular cumulative film containing carbon chains with hydrogen and fluorine atoms, which chains are attached to a backbone of

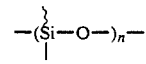

(n: integer) bond, and said backbone being bonded directly or indirectly to said recording layer through the —O— bonds thereof.

4. A recording medium comprising: a base body of said recording medium; at least one recording layer containing oxygen atoms thereon formed on said body; and at least one protection layer formed on said recording layer as a lubricant for protecting said recording layer, said protection layer being made from a monomolecular film containing carbon chains with hydrogen and fluorine atoms which chains are attached to a backbone of

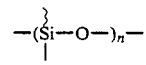

(n: integer) bond, and said backbone being bonded directly or indirectly to said recording layer through the —O— bonds thereof by a chemical adsorption technique which comprises contacting said recording layer with a silane surface active agent containing fluorine atoms, which agent is dissolved in a nonaqueous solvent.

5. The recording medium of claim 4, wherein said recording and protection layers are formed on both surfaces of said base body.

6. The recording medium of claim 4, wherein said base body is made by a material which is optically transparent.

7. The recording medium of claim 4, wherein said recording medium is magnetic recording medium, optical recording medium or recording disc.

8. A recording medium comprising: a base body of said recording medium; at least one recording layer formed on said base body; and at least one protection layer formed on said recording layer for protecting said recording layer as a lubricant, said protection layer being made from a silane of the formula: $CF_3$—$(CF_2)_m$—$(CH_2)_n$—$SiCl_3$ (m, n: integer) and said silane reacting with said recording layer to form a backbone of

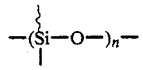

(n: integer) bond, and said backbone being bonded directly or indirectly to said recording layer through the —O— bonds thereof.

9. The recording medium of claim 8 wherein m and n are about 5 to 15.

10. A method of producing a recording medium comprising the steps of: forming a recording layer containing oxygen on a base body of said recording medium; and forming a protection layer on said recording layer, said protection layer being made from a silane surface active agent containing carbon chains with hydrogen and fluorine atoms, and said silane reacting with oxygen in said recording layer to form a backbone of

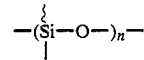

(n: integer) bond, and said backbone being bonded directly or indirectly to said recording layer through the —O— bonds thereof, said silane being applied to said recording layer by a chemical absorption technique.

11. The method of claim 10, wherein a chemical substance of the formula $CF_3$—$(CF_2)m$—$(CH_2)n$—$SiCl_3$ (m, n: integer) is used as said silane surface active agent.

12. The method of claim 11 wherein m and n are about 5 to 15.

* * * * *